United States Patent
Weisse et al.

(10) Patent No.: US 10,473,824 B2
(45) Date of Patent: Nov. 12, 2019

(54) ARTICLES HAVING IMPROVED CORROSION RESISTANCE

(71) Applicant: The Sherwin-Williams Company, Cleveland, OH (US)

(72) Inventors: Hilmar Weisse, Nideggen (DE); Dirk Hinzmann, Pulheim (DE); Andrea Engels, Duren-Niederau (DE)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 14/489,895

(22) Filed: Sep. 18, 2014

(65) Prior Publication Data

US 2015/0056459 A1    Feb. 26, 2015

Related U.S. Application Data

(63) Continuation of application No. 12/937,924, filed as application No. PCT/US2009/035522 on Feb. 27, 2009, now abandoned.

(Continued)

(51) Int. Cl.
| | |
|---|---|
| *G02B 5/08* | (2006.01) |
| *G02B 1/14* | (2015.01) |
| *B82Y 30/00* | (2011.01) |
| *C03C 17/36* | (2006.01) |
| *C23C 8/02* | (2006.01) |
| *C23C 10/02* | (2006.01) |
| *C23C 10/18* | (2006.01) |
| *C23C 10/60* | (2006.01) |
| *C23C 18/12* | (2006.01) |
| *C23C 18/16* | (2006.01) |
| *B05D 5/06* | (2006.01) |
| *C04B 41/88* | (2006.01) |

(Continued)

(52) U.S. Cl.
CPC .............. *G02B 1/14* (2015.01); *B05D 5/063* (2013.01); *B82Y 30/00* (2013.01); *C03C 17/36* (2013.01); *C03C 17/3605* (2013.01); *C03C 17/3615* (2013.01); *C03C 17/3644* (2013.01); *C03C 17/3663* (2013.01); *C03C 17/3692* (2013.01); *C04B 41/88* (2013.01); *C04B 41/90* (2013.01); *C23C 8/02* (2013.01); *C23C 10/02* (2013.01); *C23C 10/18* (2013.01); *C23C 10/60* (2013.01); *C23C 18/127* (2013.01); *C23C 18/1216* (2013.01); *C23C 18/1241* (2013.01); *C23C 18/1689* (2013.01); *G02B 1/105* (2013.01); *G02B 5/0808* (2013.01); *C03C 2217/42* (2013.01); *C03C 2218/31* (2013.01); *Y10T 428/31678* (2015.04)

(58) Field of Classification Search
CPC .......... B60R 1/12; B60R 1/06; B60R 1/0605; B60R 2001/1215; B32B 27/08; B05D 5/063; B82Y 30/00; G02B 5/08; G02B 5/0808; G02B 5/3033; G02B 5/305; G02B 5/128; G02B 1/105; G02B 1/11; G02B 1/14; Y10T 428/31678; G11B 5/708; G11B 5/735; G11B 5/714; G11B 5/7085; G11B 5/7325; G11B 11/10586; G11B 7/26; C04B 41/009; C04B 41/88; C04B 41/90; C03C 17/10; C03C 17/245; C03C 17/25; C03C 17/36; C03C 17/3605; C03C 17/3644; C03C 17/3663; C03C 17/3692; C03C 2218/152; C03C 2218/31; C03C 2217/213; C03C 2217/42; C23C 14/10; C23C 10/02; C23C 10/18; C23C 10/60; C23C 18/1216; C23C 18/1241; C23C 18/127; C23C 18/1689
USPC ........ 359/838, 839, 871, 883, 884; 428/323, 428/325, 328, 329, 332, 339; 427/162, 427/163.1, 163.4, 164, 165, 166, 16, 168, 427/169

See application file for complete search history.

(56) References Cited

U.S. PATENT DOCUMENTS

| | | |
|---|---|---|
| 4,780,372 A | 10/1988 | Tracy et al. |
| 4,894,278 A | 1/1990 | Servais et al. |

(Continued)

FOREIGN PATENT DOCUMENTS

| | | |
|---|---|---|
| DE | 10327365 A1 | 1/2005 |
| WO | 2007036538 | 4/2007 |
| WO | 2007146855 A1 | 12/2007 |

OTHER PUBLICATIONS

International Search Report for corresponding International Application No. PCT/US2009/035522 (4 pages).

(Continued)

*Primary Examiner* — Stephone B Allen
*Assistant Examiner* — Jyotsna V Dabbi

(57) ABSTRACT

A method for enhancing metal corrosion resistance of a metal deposited on a substrate is provided. The method includes contacting the metal coated substrate with a treating composition including metal oxide nano-particles. Furthermore, a method for making a mirror comprising a substrate having a metal coated thereon is provided, wherein the method includes contacting the metal coated substrate with a treating composition including metal oxide nano-particles. Preferably, the metal oxide nano-particles are selected from one or more oxides of zinc, iridium, tin, aluminum, cerium, chromium, vanadium, titanium, iron, indium, copper, gold, palladium, platinum, manganese, cobalt, nickel, zirconium, molybdenum, rhodium, silver, indium, wolfram, iridium, lead, bismuth, samarium, erbium, or mixtures of these materials. In addition, products obtainable by these methods are provided.

16 Claims, No Drawings

Related U.S. Application Data

(60) Provisional application No. 61/045,167, filed on Apr. 15, 2008.

(51) Int. Cl.
*C04B 41/90* (2006.01)
*G02B 1/10* (2015.01)

(56) References Cited

U.S. PATENT DOCUMENTS

| | | | | |
|---|---|---|---|---|
| 5,094,881 | A * | 3/1992 | Sanford | C03C 17/38 427/162 |
| 5,240,776 | A | 8/1993 | Servais et al. | |
| 5,863,611 | A | 1/1999 | Sanford | |
| 6,017,580 | A | 1/2000 | Soltys | |
| 6,565,217 | B2 | 5/2003 | Laroche et al. | |
| 6,613,818 | B1 | 9/2003 | Sakatoku et al. | |
| 2002/0028288 | A1 * | 3/2002 | Rohrbaugh | B01J 39/043 427/180 |
| 2003/0203205 | A1 | 10/2003 | Bi et al. | |
| 2005/0255237 | A1 * | 11/2005 | Zhang | B81C 1/0046 427/180 |
| 2006/0057407 | A1 * | 3/2006 | Sambasivan | C03C 17/22 428/472.3 |
| 2007/0223096 | A1 | 9/2007 | O'Connor et al. | |
| 2008/0090069 | A1 * | 4/2008 | Walters | C08F 283/006 428/330 |
| 2009/0128693 | A1 | 5/2009 | Jabado et al. | |

OTHER PUBLICATIONS

International Preliminary Report on Patentability for corresponding International Application No. PCT/US2009/035522 dated Oct. 19, 2010 (7 pages).

Holzinger, Dieter, et al.; Hybrid inorganic-organic core-shell metal oxide nanoparticles from metal salts; Journal of material chemistry, 2004, vol. 14, n 13, Institute of Materials Chemistry, Vienna University of Technology, found at http://cat.inist.fr/?aModele=afficheN&cpidt=159778643 (1 page).

Lu, Guangqiang, et al; Preparation of ZnO-Based Mixed Metal Oxide Nanoparticles via Polymer Precursor, Poster at E-MRS Fall Meeting 2006, Symposium C, Jul. 13, 2006, Max Planck Institute for Polymer Research, Germany, found at http://www.science24.com/paper/7590 (1 page).

* cited by examiner

ARTICLES HAVING IMPROVED CORROSION RESISTANCE

CROSS-REFERENCE TO RELATED APPLICATIONS

This application is a continuation of U.S. patent application Ser. No. 12/937,924, filed Nov. 29, 2010, which was the National Stage filing under 35 U.S.C. 371 of International Application No. PCT/US2009/35522 filed on Feb. 27, 2009, which itself claims priority to U.S. Provisional Application Ser. No. 61/045,167 filed on Apr. 15, 2008, both entitled "ARTICLES HAVING IMPROVED CORROSION RESISTANCE," each of which is incorporated herein by reference in its entirety.

TECHNICAL FIELD

This invention relates to articles comprising a metal coating, preferably a reflective metal coating, deposited on a substrate, such as a vitreous substrate or a plastic substrate and to methods of manufacturing such articles. Especially, this invention relates to a method of enhancing the corrosion resistance of the metal coating, preferably a reflective metal coating, deposited on the substrate and to the compositions used in that method and the articles produced by that method.

BACKGROUND

Conventional mirrors can be made by a process in which a thin layer of a reflective metallic film is applied onto a substrate, typically glass or plastic. Mirrors are generally made continuously by a sequence of steps on a mirror conveyor. The first step lightly polishes and cleans the glass surface and after rinsing, the next step sensitizes the surface, e.g., with an aqueous stannous chloride solution. The metal deposited on the substrate is typically silver, although other metals or metal compositions may be used. The silver film layer is deposited on the sensitized glass surface by one of many methods such as described in U.S. Pat. No. 4,737,188 to Bahls. In one typical process, an ammoniacal silver nitrate solution and a reducing agent solution containing a strong base are sprayed on and combined at the sensitized glass surface to deposit the silver film.

If air, water, contaminants, chemicals such as ammonia and other glass cleaners, or other compounds, come in contact with the reflective metallic film, the film may corrode, oxidize, or lose contact with the glass. To protect the film and reduce damage to the metallic layer, a protective overlay of copper may be applied over the metallic film, and/or a protective paint may be applied. This copper film may be applied to and over the silver film by any of a variety of prior art procedures such as a galvanic process which utilizes an aqueous suspension of iron powder and an aqueous solution of copper sulfate or by the disproportionation of cuprous ions on the silver surface. The latter process is described in U.S. Pat. No. 5,419,926 to Soltys. The copper layer is normally painted to produce the finished mirror, or another protective coating such as a hardened organic resin incorporating a corrosion inhibitor may likewise be applied as shown in U.S. Pat. No. 5,156,917 to Sanford. A standard mirror making process thus comprises a series of steps performed in sequence on a conveyor as part of a continuous mirror making process.

Historically, a serious problem of the mirror manufacturing industry was the need for the copper layer on the silver layer to inhibit corrosion of the silver and increase adhesion of the paint. The application of copper to the silver surface necessarily produces copper containing waste streams, which must be environmentally treated or processed for recycling. Typically, the copper waste streams are treated to remove copper before discharge to the effluent, which is complex and costly. The copper film on the mirror is also a weak link in the life of a conventional mirror. The copper film is easily corroded when the mirror is subjected to ammonia or alkaline glass cleaners, which cause the edges of mirrors to corrode and turn black in color, thereby shortening the life of the mirror.

In the seventies researchers found a method of improving the adhesion of metallic silver or copper films on surfaces like glass (e.g. A. Ya. Kuznetsov, et al. in Soy. J. Opt. Technol. 42, 1975, 604). By "activating" a glass surface sensitized with tin dichloride with a $PdCl_2$ solution a markedly improved adhesion has been recognized. Furthermore, it has been realized that corrosion protection may also be enhanced by improving adhesion between the layer of the reflective metal and the substrate. This finding helped to overcome the above-mentioned problem of the mirror manufacturing industry. Due to the improved adhesion of the metallic silver film on the substrate the need for protective coatings (e.g. the copper layer mentioned above) overlying the metallic layer has been eliminated. The mirror manufacturing industry now uses Pd-based activation (supersensitizing) to produce so called "copper-free mirrors."

A number of patents have been issued for improving treatment of the silver surface in the mirror making process to further increase corrosion resistance. In U.S. Pat. No. 5,374,451 to Servais et al., a mirror is shown having a reflective layer of silver which has been treated with a solution containing ions of at least one of the group consisting of: Cr (II); V (II or III); Ti (III or II); Fe (II); In (I or II); Cu (I); and Al (III). The solution may alternatively contain Sn (II) ions. In U.S. Pat. No. 5,235,776 to Servais et al., a reflective article is described including a glass substrate and a reflective metal coating, preferably silver, deposited on the glass substrate. This reflective layer of silver has been treated with an acidified aqueous solution of a stannous salt. This solution has to be free from opalescence and, therefore, needs to be freshly-made. By this treatment, a population of tin atoms is augmented in a surface stratum of the silver layer. As a preferred embodiment a silane treatment has been applied to the metal coating before a final outside coating, e.g. a paint layer, is applied.

Furthermore, it is known to apply a tin precipitate on top of the silver layer, which optionally can be further treated with a silane solution, see, e.g., U.S. Pat. Nos. 6,017,580; 6,218,019; and 6,432,200 (Soltys).

Unfortunately, current methods of treating surfaces of reflective metal coatings to inhibit corrosion thereof are quite costly and in some cases involve the application of a two-component system.

SUMMARY

For convenience, the following description will be mainly directed to mirrors and improving the corrosion resistance of the reflective layer used to make the mirror but it will be understood by those skilled in the art that other articles (e.g., metal containing substrates and metal particles) may be treated using the method of the invention to enhance the properties of the articles, e.g., the corrosion resistance of the metal.

In a first aspect the present invention refers to a method for enhancing metal corrosion resistance of a metal, preferably a reflective metal, deposited on a substrate. The method comprises contacting the metal-coated substrate with a treating composition comprising metal oxide nano-particles.

In a second aspect, the present invention refers to a method for making a mirror comprising a substrate having a reflective metal coated thereon. The method comprises contacting the metal-coated substrate with a treating composition comprising metal oxide nano-particles.

In a third aspect, the present invention refers to a substrate having a metal (e.g., a reflective metal layer) deposited thereon, wherein the metal has been contacted with a treating composition comprising metal oxide nano-particles.

In a fourth aspect, the invention provides a mirror having a reflective metal deposited on a substrate, wherein the metal layer has been contacted with a treating composition comprising metal oxide nano-particles.

In a fifth aspect, the invention provides a treating composition comprising metal oxide nano-particles.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF THE PREFERRED EMBODIMENTS

In one embodiment of the present invention, a method for enhancing metal corrosion resistance of a metal (e.g., a reflective metal) deposited on a substrate is provided, the method comprises contacting the metal coated substrate with a treating composition comprising metal oxide nano-particles.

In a preferred embodiment the treating composition according to the present invention comprises metal oxide nano-particles dispersed or suspended in a carrier, preferably an aqueous carrier.

Suitable aqueous carriers include liquids that preferably comprise more than 50% by weight water, more preferably more than 80% by weight water. As a further component, a cosolvent (e.g., a lower alcohol having 1 to 4 carbon atoms or a lower ketone having 3 or 4 carbon atoms) can be used in an amount of preferably less than 50% by weight, more preferably less than 20% by weight. In a preferred embodiment the aqueous carrier is water.

Suitable metal oxide nano-particles include oxides of any metal that enhances the performance or corrosion resistance of the underlying metal. Examples of such suitable metal oxides include oxides of zinc, iridium, tin, aluminum, cerium, chromium, vanadium, titanium, iron, indium, copper, gold, palladium, platinum, manganese, cobalt, nickel, zirconium, molybdenum, rhodium, silver, indium, wolfram, iridium, lead, bismuth, samarium, erbium, or mixtures of these materials. Preferred metal oxides include oxides of zinc, iridium, tin, aluminum, cerium, titanium, or mixtures of these materials.

Typically, the metal oxide nano-particles are prepared in the form of very small particles, which are typically generally spherical, although flake and rod-shaped particles might alternatively be used.

When provided in generally spherical form, the particles typically have a diameter of less than 200, more preferably less than 100, and most preferably less than 70 nanometers (nm). When provided in generally spherical form, the particles typically have a diameter of greater than 1, preferably greater than 2, and more preferably greater than 5 nm. Particle sizes of commercial materials are typically measured as a weight average size. When provided in flake and rod-shape form, the particles typically have a longest length of less than 1000, more preferably less than 300, and most preferably less than 100 nanometers (nm) greater, and a typical minimum length (or thickness) of greater than 1, preferably greater than 2, and more preferably greater than 5 nm.

Preferred metal oxide nano-particles have a surface area of between 20 and 500, more preferably between 25 and 300, and most preferably between 30 and 200 $m^2/g$.

Commercially available metal oxide nano-particle dispersions include:

VP Ad Nano ZnO 20DW (zinc oxide) and VP Ad Nano ITO DE (iridium-tin-oxide, with a 30 to 45 $m^2/g$ surface area) from Degussa;

Nanobyk 3600 (aluminium oxide), Nanobyk 3820 (zinc oxide, particle size 20 nm), Nanobyk 3840 (zinc oxide, particle size 40 nm), Nanobyk 3860 (zinc oxide, particle size 60 nm), and Nanobyk 3810 (cerium oxide, particle size 10 nm) from Byk; and ammonia dispersed tin oxide (particle size <10 nm, surface area 150 to 200 $m^2/g$) and hydrated tin oxide dispersion (particle size 2-10 nm, surface area 150 to 200 $m^2/g$) from Keeling & Walker.

In preferred embodiments, the treating composition comprises an efficacious amount of the metal oxide nano-particles. The preferred amount of such nano-particles will typically depend on the metal being protected and the choice of nano-particles. The preferred amount generally can be determined for a particular metal and nano-particle containing treating composition through the use of a suitably constructed design experiment. Commercially available metal oxide nano-particle dispersions are often provided by the manufacturers at a concentration of up to 55 wt % (in the case of the Nanobyk materials) and this concentration is higher than is usually needed in the inventive method. Consequently, to prepare a suitable treating composition it is preferred to dilute the materials to a lower concentration. In general, preferred treating compositions include up to about 5, more preferably up to 1, even more preferably up to 0.1, most preferably up to 0.05, and optimally up to about 0.03 wt. % nano-particles. In general, preferred treating compositions include at least about 0.0001, more preferably at least 0.005, and most preferably at least 0.01 wt. % nano-particles.

In preferred embodiments, an efficacious amount of the treating composition is applied to the metal. The preferred amount of deposited treating solution will depend on the metal being protected and the choice of nano-particles. The preferred amount can be determined for a particular metal and nano-particle containing treating composition through the use of a suitably constructed design experiment. In general, preferred treating compositions are applied at an amount of from 5 to 5,000, more preferably at a rate of 50 to 1,000, and most preferably at a rate of 300 to 600 $ml/m^2$ of metal being treated.

In a preferred embodiment the treating composition is applied to the surface of the metal in an amount about 0.01 to about 2000, more preferably in an amount about 0.1 to about 1000, and most preferred in an amount of about 0.5 to about 100 mg/m$^2$.

In addition to the metal oxide component and the aqueous carrier the treating composition according to the present invention can optionally comprise an additive such as a surfactant, emulsifier, dispersant and the like. It is believed that the aforementioned commercially available nano-particle materials already contain one or more additives (e.g., a dispersing aid). Consequently, for these materials it was not required to add any additional additive. When used, the additive preferably will be present in the treating composition in an amount of 0 to 1% by weight, more preferably in an amount of less than 0.5% by weight with respect to the treating composition.

Application of the treating composition can be performed using any suitable method of applying aqueous compositions to a substrate. Suitable methods for contacting a substrate with a treating composition include, but are not limited to, dripping, spraying, rolling, brushing, dipping, pouring, immersion, curtain coating, etc. Of these, spray application is preferred, and may be carried out, for example, using small sprayers or large sprayers on a traverse mechanism.

The treating composition is typically allowed to contact the substrate for a dwell time of at least 0.1 seconds, preferably between 0.5 seconds and 5 minutes, more preferably between 1 second and 2 minutes, and optimally between 10 seconds and 60 seconds, after which the treating solution may be optionally rinsed off and/or dried.

It is believed that application of the treating composition will result, after drying, in a layer (or partial layer) of the nano-particles being deposited on the metal coated substrate. However, it is not known whether the nano-particles remain after application or are perhaps rinsed away after they have effected their purpose on the metal surface. In the event they remain, it would be expected that the nano-particle layer (or partial layer) will have a mono-layer thickness (i.e., a thickness corresponding to the nano-particle size). However, because of the small amounts that can be used and the very small size of the nano-particles it is difficult to measure the precise quantity of any nano-particles that might be retained on the treated surface.

Temperature is another factor that should be controlled for optimal performance when contacting the metal, preferably reflective metal, coated substrate with a treating composition. Suitably the temperature according to the present invention can be in a range between 1° to 60° C. The preferred temperature range is between 20° to 35° C., and more preferably between 21° to 32° C.

The substrate according to the present invention include any substrates onto which a metal film or layer, preferably a reflective metal film or layer, can be applied. Exemplary substrates include, but are not limited to, substrates selected from vitreous products including ceramics or glass (including, e.g., soda lime glass and other conventional glass products used in mirror making manufacture); materials used in making Christmas ornaments; polymeric materials; and particles, e.g., metal particles. Suitable polymeric materials include thermoplastics, and thermosets such as polycarbonate, LEXAN, plexi-glass, lacquered materials (e.g. materials covered with an acryl lacquer), polyethylene, polymethacrylate, and other polymeric materials. Suitable particles may include particles of the aforementioned materials as well as silver flakes and powders, metal (silver) coated mica, metal (silver) coated metal particles, e.g., Ni or Cu particles, and the like. All these substrates may be treated using the method of the invention to increase the corrosion resistance.

The substrate can be in a variety of shapes and need not be planar. For example, the substrate could be planar, curved (e.g., as in a solar mirror), or could be initially planar and then bent to a curve after having been metallized. It is important to select input materials carefully, and substrates of good quality should be used to get a superior final product. In a preferred embodiment, the substrate is a sheet of glass used for mirror production.

According to the present invention, the metal deposited on a substrate can be selected from silver, gold, copper, nickel, lead, ruthenium, chrome, and combinations (e.g., mixtures or alloys) that contain these metals. Silver is preferred.

In one embodiment, the present invention refers to a method for enhancing metal corrosion resistance of a metal deposited on a substrate, the method comprises contacting the metal coated substrate with a treating composition comprising metal oxide nano-particles. Moreover, the present invention refers to a method for making a mirror comprising a substrate having a metal, preferably a reflective metal, coated thereon, the method comprises contacting the metal coated substrate with a treating composition comprising metal oxide nano-particles.

In a preferred embodiment, the method for making a mirror having enhanced metal corrosion resistance comprises the further process steps of (i) supplying a substrate, (ii) cleaning the substrate, (iii) optionally sensitizing the substrate, (iv) optionally activating the substrate, and (v) applying a layer of metal, preferably reflective metal, onto the substrate.

Preferably, the substrates used in the method of the present invention are clean or are cleaned. While not intending to be bound by theory, it is believed that having a clean substrate is important, as contaminants can have a very negative effect on the finished product. Typically, the cleaning is done as known in the art, e.g., by washing with water, optionally containing a surfactant solution as known in the art (e.g. a 0.1% surfactant solution, e.g., Deterlon K3/Valspar) and optionally scrubbing using a cerium oxide based slurry or a cerium oxide based slurry optionally comprising one or more compounds selected from chalk, iron oxide and the like. Other compounds may be used in conjunction with the cerium oxide, or may replace the cerium oxide entirely.

After the substrate surface has been cleaned and preferably rinsed, it is then optionally sensitized using, for example, conventional sensitizing solutions. In general, a conventional stannous ion solution, including $SnCl_2$, $SnF_2$, $SnI_2$, $SnBr_2$, but most typically a $SnCl_2$ solution, is applied to the substrate. The sensitizing solution can be applied to the glass surface by pouring, immersion, dipping, spraying or rinsing the solution over the glass surface. An acidic stannous solution is generally used to sensitize the glass surface, although the stannous solution alone can be used if it is prepared shortly before use. A stannous ion concentration of 10-1000 mg/l and a pH of 2-5 is typically employed but these sensitizing solutions may vary widely in composition and concentration. This sensitizing solution is typically in contact with the substrate just long enough to adsorb a thin layer of molecules onto the substrate surface. The time varies depending on the concentration used, but is often less than 30 seconds, and preferably less than 20 seconds. Following the addition of the optional sensitizer, the substrate preferably is rinsed with deionised water.

Generally, the sensitizing step can be carried out prior to, after or simultaneously to an optional activating (supersensitizing) step. However, it has been observed that the order of the steps seems to be important to obtain good durability. Therefore, carrying out the sensitizing step prior to an optional activating step is preferred. An acidic solution comprised of at least one ion selected from the group consisting of bismuth (III), chromium (II), gold (III), indium (III), nickel (II), palladium (II), platinum (II), rhodium (III), titanium (III), vanadium (III) and zinc (II) has been described in the prior art. However, the present invention is not restricted to this specific activation method. The activation can also be effected according to the teaching of U.S. patent application Ser. No. 11/919,904, which application is hereby incorporated by reference.

Application of the activation solution can be performed using any suitable method of applying liquids to a substrate. Suitable methods for contacting a substrate with a solution of the activation composition include, but are not limited to, dripping, spraying, rolling, brushing, dipping, pouring, immersion, and curtain coating. Of these, spray application is preferred, and may be carried out using small sprayers or large sprayers on a traverse mechanism.

After optionally cleaning the substrate, optionally sensitizing the substrate, and optionally activating the substrate as described above, a layer of metal is coated onto the substrate according to methods and techniques known in the art. For example, the metal may be deposited on to the substrate by a variety of methods including metalizing, electrical deposition, and electroless deposition. In the mirror production process, the method of electroless deposition is generally used both for speed and cost reasons. This electroless deposition process includes several steps to change the starting substrate into the finished product. In production plants, these steps are generally conducted on the substrate as it moves on a conveyor through the different stages. For superior production, de-ionized water is typically used in all steps, preferably having at least a 1 million-ohm resistance.

In a preferred embodiment silver is used as a metal. Such a silver coating can be applied to the optionally sensitized, optionally activated glass surface following conventional coating techniques such as described in U.S. Pat. No. 4,737,188. Basically, a silver solution and a reducing solution are brought together before or at contact with the substrate to be silvered by pouring or metering the solutions such that they meet just before contact with the substrate. Alternatively, the component solutions may be sprayed using an air or airless system prior to or simultaneously with intermixing at the surface of the substrate.

These component solutions may be mixed together before use, may be mixed just prior to spraying, or sprayed independently onto the glass. Preferably they are each mixed into the same water stream just prior to the point of spraying. The silver solution can be any solution in which the silver is present in the ionic state and is sufficiently soluble in water for easy application and reaction with the reducing solution. Therefore, the ionic silver solution can be formed from silver salts, silver complexes, coordination compounds and the like, or mixtures thereof. Ammonia is the preferred complexing agent, and is used to form an ammoniated silver nitrate solution. The reducing solution can be formed from invert sugars, N-methylglucamine, D-glucamine, glucono-delta-lactone, glucosaminic acid, other compounds known in the art as reducing agents or mixtures thereof. Usually the reducing solution will also be mixed with a sodium hydroxide or ammonium hydroxide solution to create the proper alkaline pH for the reaction to proceed. The silvering solution is typically in contact with the substrate long enough to create the proper metal film thickness. The time varies depending on the concentration used and the reaction conditions, but is often less than two minutes and is preferably one minute or less. Depending on anticipated use and desired quality, the silver thickness is generally more than 500 milligrams of silver per square meter ($mg/m^2$) of substrate. More preferably it will be more than 600, and most preferably will be more than 800 $mg/m^2$. Usually the silver thickness is generally less than 1400, preferably less than 1000, and more preferably less than 900 $mg/m^2$ of substrate. Following the silvering solutions the substrate is typically again rinsed with deionised water.

The layer of silver may be deposited in the form of a silver coating, which is preferably fairly thin so that it is transparent. Flat glass substrates carrying such transparent coatings are used to form glazing panels which reduce the emission of infrared radiation and/or which protect from solar radiation. Thus, according to one embodiment of the invention, the thickness of the layer of silver formed in the silvering step is preferably between 8 and 70 nm, and more preferably between 8 and 30 nm. According to another embodiments of the invention, where the product is a mirror, for example a domestic mirror or a vehicle rear-view mirror the thickness of the layer of silver formed in the silvering step is between 70 and 100 nm.

It is conventional to protect the silver coating with an overcoating of copper to retard tarnishing of the silver layer. The copper layer is itself protected from abrasion and corrosion by a layer of paint. Historically, those paint formulations, which afford the best protection against corrosion of the copper layer, contain lead pigments. The use of lead pigments is being discouraged. Furthermore, the addition of a copper layer adds time and expense to the mirror making, and adds weight to the final product. Therefore, creating a final product that has high performance without a copper layer is desirable.

According to the present invention, a conventional protective layer of copper is not necessary and, therefore, paint formulations containing lead pigment are no longer necessary since the mirror according to the present invention is produced following the concept of the so called "copper-free mirrors," with the improvement that the surface of the reflective metal deposited onto the substrate is treated with a treating composition comprising metal oxide nano-particles.

After application of the treating composition the substrate is heated. Prior to this stage, the substrate preferably should be rinsed and air blowers used to remove all free water from the surface. In this stage, the substrate preferably will be heated to dry water vapor from the substrate and warm up the substrate for the final coating. The temperature used suitably is in the range of 30° to 80° C., preferably in the range of 54° to 71° C. The preferred pre-heating time is usually in the range of 30 seconds to 2 minutes and more preferably approximately 1 minute. As the water and water vapor is driven off, this stage increases adhesion of the metallic layer to the glass surface and also enables the final coating to have superior performance.

The silver coating having the treating composition applied thereon, may now be covered with one or more protective paint layers and according to a preferred aspect of this invention such a paint can be free, or substantially free, of lead and can be based on alkyd, acrylic, epoxy, polyester, and polyurethane based resins known in the art. Also, leaded paints, although not necessary, are usable. Optionally, this protective paint may consist of a base coat and at least one top coat, or the protective paint may consist of a single coating. These coatings may be sprayed on, brushed on, rolled on, applied via a curtain coating, applied by using an electrostatic process, or by using other techniques. Preferably, curtain coating will be used for a liquid coating, and electrostatic application for a powder coating.

Exemplary such paints include Valspar SK1390 (0.15% lead, base coat), SK1395 (top coat), SK3335 (0.49% lead, base coat), SK3480 (0% lead, 0% zinc, base coat), SK3465 (0.14% lead, 0% zinc, base coat), Valspar SK9675 (9.5% lead, base coat), SK1420 (0.6% lead, single coat), and SK1750 (6% lead, single coat).

Generally, the final coating is highly resistant to the environment and also helps to physically protect the layers. The preferred final coating will therefore be both light and strong. The final coating may be a powder coating, for example, on the basis of an epoxy resin, e.g., Valspar X98-47-1. After application, the coating may optionally be cured, e.g., using heat, UV-, IR-, NIR-, or e-beam radiation.

Preferably, the protective paint layer applied according to the present invention has a thickness of 10-100 μm, more preferably of 20-50 μm in case of a one layer protective paint; and has a thickness of 10-100 μm, more preferably of 30-70 μm in case of a two layer protective paint. In addition, in some instances a further UV-stable coating can be applied on top of the protective paint layer, e.g., in a thickness of 2-10 μm. Suitable UV-stable coatings include epoxy-based products known in the art.

The next step may include optional final washing and final drying. This is to clean any overspray of silver or final outside coating and any other particles that may be on the final substrate. This cleaning may involve the use of ferric salts rubbed against the substrate with rubber rollers. After the washing, there is usually an optional final drying step. This dries the mirror and removes free water and water vapor from the final product. The final washing and drying steps help ensure that the substrate is clean. In addition to removing overspray, the final steps help decrease tackiness of the final coating and help remove any possible contaminants from the surfaces that may damage the substrates when they are stacked or stored together.

The inventive method for enhancing metal corrosion resistance of a metal, preferably reflective metal, deposited on a substrate has been found to provide improved product longevity and weatherability. This is greatly advantageous, especially for copper-free mirrors. Moreover, the handling of the inventive treating composition is easier than those of the prior art, since according to the present invention a one-component system can be used in contrast to two component systems of the prior art. The inventive method is less expensive than the prior art methods and does not only protect the deposited metal layer against corrosion but also enhances the adhesion of an optional final outside coating, e.g., a paint commonly used in the art.

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples are obtained, or are available, from the chemical suppliers described below, or may be synthesized by conventional techniques.

EXAMPLES

Test Methods

Copper-Accelerated Acetic Acid Salt Spray Test (CASS): This test follows the ISO 9227 standard except that the samples in this test were placed like a rhombus and the upwards sides were judged. The edge corrosion was measured with a WILD-Microscope with calibrated Reticule measuring device. The surface corrosion was appraised by visual inspection with a halogen light.

Adhesive Test: The adhesive test was run by applying a 5 μm sample of adhesive onto the painted side of a 100×100 mm mirror and then pressing a glass plate against the adhesive using a 4 mm shim to control the gap, and allowing the adhesive to set for 5 days at room temperature and the test piece is evaluated. The test piece was then placed in a 50° C. and 95% relative humidity chamber for 10 days and reevaluated. For each time period the test piece was observed for defects. A rating scale of 0 to 5 was used to assess the samples (with 0 being good, i.e., no defects, and 5 being very bad). An "s" notation indicates that a spot was observed using a 20 W halogen lamp in a dark room to illuminate the test piece. Three commercially available adhesives were evaluated: Soudal Silirub 2 (available from Soudal), Perennator FA-101 (available from Illbruck), and Perennator AQ201 (available from Illbruck).

Example 1

Run 1: Preparation of a Control Sample According to a Standard Process

The following solutions were diluted to the given concentrations with deionised water:

Solution-1: 0.1% surfactant solution (Deterlon K3/Valspar)
Solution-2: 5% cerium oxide (CERI 2645-Pieplow&Brandt)
Solution-3: 0.04% RNA solution (Valspar/stannous chloride solution)
Solution-4: 0.02% RNG 7252 solution (Valspar/palladium dichloride)
Solution-5: 5% GMP-MS silver solution (Valspar)
Solution-6: 5% GMP-MA reduction solution (Valspar)
Solution-7: 0.5% GMP-A metallizing solution (Valspar)
Solution-8: 0.5% GMP-B silanization solution (Valspar)

Preliminary cleaning of a glass plate followed by polishing: A flat glass sheet (0.75 m×0.45 m) is cleaned with 200 ml of Solution-1 by means of a sponge. Subsequently, the glass is rinsed with deionised water. The glass is polished with 200 ml of Solution-2 by means of a felt-coated vibrating grinder for 90 seconds and rinsed with deionised water.

Sensitization of the glass: The glass is sensitized by pouring 170 ml of Solution-3 onto it for 20 seconds. Subsequently it is rinsed with deionised water.

Activation of the glass: The glass is activated by pouring 250 ml of Solution-4 onto it. The solution remains on the surface for 45 seconds. Subsequently, the surface is rinsed with deionised water.

Silver-plating of the glass: The glass plate is silvered by first spraying it with Solution-5 and subsequently spraying it with a combination of Solution-5 and Solution-6 (1:1 ratio) in an amount of 380-400 ml/m². The solutions are sprayed on by means of a pressurized vessel so that they mix on the glass surface. Silvering takes place at a glass temperature of 28 to 30° C. The solutions remain on the glass for 45 seconds. Subsequently, the glass is rinsed with deionised water.

Passivation of the silver layer: Solution-7 and Solution-8 (1:1 ratio) in an amount of 180-240 ml/m$^2$ are sprayed onto the silver from a pressurized vessel so that they mix on the glass surface. Subsequently, after approximately a 40 second dwell time, the surface is rinsed with deionised water.

Lacquer coating: The glass sample is pre-dried with air and then dried for 24 hours at room temperature prior to coating it with two protective lacquer layers. The lacquers, a base lacquer Valspar SK 3335 or SK 3480 or SK3465 (as indicated below) and a finishing lacquer Valspar SK 1395 or SK 3455 (as indicated below), are applied by means of a Burkle casting machine at a dry thicknesses between 22 and 28 μm, each. A total thickness of the layers of 50 μm is aimed at. The glass sample coated with the lacquers are baked at temperatures of 140 to 150° C. for 3 to 3.5 minutes in a continuous IR-furnace.

Runs 2 to 5: Preparation of the Samples According to the Present Invention

The preparation of samples according to the above standard process is followed except for the passivation step. According to the present invention Solution-7 and Solution-8 are replaced by a treating composition comprising metal oxide nano-particles.

Run 2: A treating composition was prepared using 0.05 wt. % VP Ad Nano ZnO 20DW (zinc oxide) in water. This calculates to approximately 0.01 wt. % nano-particles in water.

Run 3: A treating composition was prepared comprising 0.05 wt. % Nanobyk 3600 in water. This calculates to approximately 0.0275 wt. % nano-particles in water.

Run 4: A treating composition was prepared using 0.025 wt. % VP Ad Nano ZnO 20DW (zinc oxide) in water. This calculates to approximately 0.005 wt. % nano-particles in water.

Run 5: A treating composition was prepared comprising 0.025 wt. % Nanobyk 3600 in water. This calculates to approximately 0.01375 wt. % nano-particles in water.

The results depicted in Table 1 were made using a lead-free base coat paint (SK 3480) and a topcoat (SK 3455).

TABLE 1

| | CASS test | | | | |
|---|---|---|---|---|---|
| Treating composition | Hours in CASS | Edge corrosion (micron) | Spots (number per dm$^2$) | Surface corrosion (rating: 0 is good, 5 is bad) | Flake off (rating: 0 is good, 5 is bad) |
| GMP A/B | 120 | 957 | 10 | 0 | 0 |
| GMP A/B | 360 | 1260 | 20 | 1 | 3 to 4 |
| Run 2 (ZnO) | 120 | 150 | 1 | 0 | 0 |
| Run 2 (ZnO) | 360 | 380 | 10 | 0 | 1 |
| Run 3 (AlO) | 120 | 140 | 2 | 0 | 0 |
| Run 3 (AlO) | 360 | 330 | 13 | 2 | 1 |

As shown above, the results for the nano-particle containing treating solutions was very favorable compared to the control.

The results depicted in Table 2 are using a 0.14% lead-containing paint (SK 3465) and a topcoat (SK 3455).

TABLE 2

| | CASS test | | | | |
|---|---|---|---|---|---|
| Treating composition | Hours in CASS | Edge corrosion (microns) | Spots (number per dm$^2$) | Surface corrosion (rating 0 is good, 5 is bad) | Flake off (rating 0 is good, 5 is bad) |
| GMP A/B | 120 | 750/190* | 6 | 0 | 0 |
| GMP A/B | 360 | 1053/440* | 17 | 1 | 3 |
| Run 4 (ZnO) | 120 | 200 | 1 | 0 | 0 |
| Run 4 (ZnO) | 360 | 560 | 8 | 1 | 0 |
| Run 2 (ZnO) | 120 | 330 | 1 | 0 | 0 |
| Run 2 (ZnO) | 360 | 640 | 8 | 1 | 0.5 |
| Run 5 (AlO) | 120 | 380 | 1 | 0 | 0 |
| Run 5 (AlO) | 360 | 700 | 6 | 1 | 1 |
| Run 3 (AlO) | 120 | 350 | 1 | 1 | 0 |
| Run 3 (AlO) | 360 | 660 | 7 | 2 | 1 |

*Two separate evaluations were performed and are reported.

As shown above, the results for the nano-particle containing treating solutions was very favorable compared to the control.

The adhesive test results are summarized in Table 3.

TABLE 3

| | Adhesive-Humidity test 50° C. | | | | | |
|---|---|---|---|---|---|---|
| | Soudal Silirub 2 | | Perennator FA-101 | | Perennator AQ201 | |
| | 5 days | 10 days | 5 days | 10 days | 5 days | 10 days |
| | x y | x y | x y | x y | x y | x y |
| GMP-A/B* | 1 1 | 1 1 | 1 1 | 1 1 | 4 1 s | 5 1 s |
| VP Ad Nano ZnO 20DW** | 1 1 | 1 1 | 1 1 | 1 1 | 4 1 s | 4 1 s |
| Nanobyk 3600** | 1 1 | 1 1 | 1 1 | 1 1 | 1 1 | 2 1 s |

*Application volume of 0.75 ml/m$^2$ each solution.
**Application volume of 0.22 ml/m$^2$.
x = change in the mirror surface in the area of the adhesive.
y = change in the mirror surface in the area free of adhesive.

As illustrated in Table 3, three different type of glues were evaluated. The glue Perennator AQ201 was the most challenging one. As illustrated, the nano-particle-containing treating compositions performed as well as or better than the control treatment.

The evaluation of the examples according to the present invention in comparison with a standard shows that the treating composition comprising metal oxide nano-particles provides a passivation that is overall better than that obtained with the standard passivation process. A further advantage provided by the present invention is that the inventive treating composition is only a one-component system allowing a faster drying with a blower after application.

A number of embodiments of the invention have been described. Nevertheless, it will be understood that various modifications may be made without departing from the spirit and scope of the invention. Accordingly, other embodiments are within the scope of the following claims.

The complete disclosure of all patents, patent applications, and publications are incorporated herein by reference as if individually incorporated.

What is claimed is:

1. A method for making a copper-free mirror comprising:
   providing a substrate;
   applying a reflective metal coating to the substrate;
   applying a treating composition by contacting the metal coated substrate for a dwell time of about 10 to 60 seconds with an inorganic treating composition in an aqueous carrier comprising more than 80% by weight water, the treating composition comprising a solution, suspension or dispersion containing between 0.0001 wt % and 1 wt % metal oxide nano-articles; and
   heating the substrate for about 30 seconds to 2 minutes at a temperature of about 30 to 80° C. after the treating composition is applied.

2. The method of claim 1, wherein the metal coating comprises silver.

3. The method of claim 2, wherein the method further comprises the steps of: (i) cleaning, sensitizing, and optionally activating the substrate prior to applying the silver metal coating, and (ii) applying one or more layers of a protective paint after heating the substrate.

4. The method of claim 3, wherein the protective paint is applied directly to the silver metal.

5. The method of claim 3, wherein the protective paint is lead-free.

6. The method of claim 1, wherein the treating composition comprises one or more oxides of zinc, iridium, tin, aluminum, cerium, chromium, vanadium, titanium, iron, indium, copper, gold, palladium, platinum, manganese, cobalt, nickel, zirconium, molybdenum, rhodium, silver, indium, wolfram, iridium, lead, bismuth, samarium, erbium, or a mixture of these materials.

7. The method of claim 1, wherein the treating composition comprises one or more oxides of zinc, iridium, tin, aluminum, cerium, titanium, or a mixture of these materials.

8. The method of claim 1, wherein the nano-particles are generally spherical and have an average diameter of between 1 and 200 nm.

9. The method of claim 8, wherein the nano-particles have a surface area of between 20 and 500 $m^2/g$.

10. The method of claim 1, wherein the nano-particles have a surface area of between 20 and 500 $m^2/g$.

11. The method of claim 1, wherein the treating composition is applied at an amount of between 5 and 5,000 $ml/m^2$ of metal being treated.

12. The method of claim 1, wherein the treating composition is applied to the surface of the metal in an amount about 0.01 to about 2,000 $mg/m^2$.

13. The method of claim 1, wherein the substrate is a vitreous substrate.

14. The method of claim 13, wherein the vitreous substrate is a ceramic or glass substrate.

15. The method of claim 1, wherein the substrate is a plastic substrate.

16. A mirror made by the method of claim 1.

* * * * *